United States Patent
Griffin

(10) Patent No.: US 9,147,008 B2
(45) Date of Patent: Sep. 29, 2015

(54) ACTIVITY BASED RECOMMENDATIONS WITHIN A SOCIAL NETWORKING ENVIRONMENT BASED UPON GRAPH ACTIVATION

(71) Applicant: Cisco Technology, Inc., San Jose, CA (US)

(72) Inventor: Keith Griffin, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 152 days.

(21) Appl. No.: 13/741,758

(22) Filed: Jan. 15, 2013

(65) Prior Publication Data

US 2014/0074893 A1  Mar. 13, 2014

Related U.S. Application Data

(60) Provisional application No. 61/700,546, filed on Sep. 13, 2012.

(51) Int. Cl.
*G06F 17/30* (2006.01)
*H04L 29/08* (2006.01)
*G06Q 50/00* (2012.01)
*G06Q 30/06* (2012.01)

(52) U.S. Cl.
CPC .... *G06F 17/30958* (2013.01); *G06F 17/30867* (2013.01); *G06Q 30/0631* (2013.01); *G06Q 50/01* (2013.01); *H04L 67/22* (2013.01)

(58) Field of Classification Search
USPC .......................................... 707/798
See application file for complete search history.

(56) References Cited

U.S. PATENT DOCUMENTS

| | | | |
|---|---|---|---|
| 7,797,345 B1 | 9/2010 | Martino et al. | |
| 7,818,392 B1 | 10/2010 | Martino et al. | |
| 7,818,394 B1 | 10/2010 | Lawler et al. | |
| 7,831,684 B1 | 11/2010 | Lawler et al. | |
| 7,844,671 B1 | 11/2010 | Lawler et al. | |
| 7,853,881 B1* | 12/2010 | Aly Assal et al. | 715/734 |
| 7,856,449 B1 | 12/2010 | Martino et al. | |
| 7,860,889 B1 | 12/2010 | Martino et al. | |
| 8,010,619 B1 | 8/2011 | Lawler et al. | |
| 8,185,558 B1* | 5/2012 | Narayanan et al. | 707/798 |

(Continued)

OTHER PUBLICATIONS http://en.wikipedia.org/wiki/Spreading_activation; Spreading activation—Wikipedia, the free encyclopedia, Jan. 2, 2013, (3 pages).

(Continued)

*Primary Examiner* — Debbie Le
(74) *Attorney, Agent, or Firm* — Edell, Shapiro & Finnan, LLC

(57) ABSTRACT

In a network environment between a group of endpoint computing devices, where content is shared between the group of endpoint computing devices via a social network platform, techniques are described herein for receiving a social activity feed associated with the social network platform, the social activity feed including activities occurring within the social network platform. An algorithm is applied to a social graph of a user at an endpoint computing device of the group to determine a prioritization of nodes within the user's social graph, activities within the social activity feed are associated with nodes of the user's social graph, and recommendations are provided to the user of activities within the social activity feed that correspond with prioritized nodes of the user's social graph.

18 Claims, 9 Drawing Sheets

(56) References Cited

U.S. PATENT DOCUMENTS

| | | | |
|---|---|---|---|
| 8,527,596 B2* | 9/2013 | Long et al. | 709/206 |
| 8,601,027 B2* | 12/2013 | Behforooz et al. | 707/790 |
| 8,843,528 B1* | 9/2014 | Behforooz et al. | 707/803 |
| 8,856,248 B2* | 10/2014 | Chen et al. | 709/206 |
| 2010/0205541 A1* | 8/2010 | Rapaport et al. | 715/753 |
| 2011/0112975 A1 | 5/2011 | McQueen | |
| 2011/0126132 A1* | 5/2011 | Anderson et al. | 715/758 |
| 2011/0213785 A1 | 9/2011 | Kristiansson et al. | |
| 2011/0320423 A1 | 12/2011 | Gemmell et al. | |
| 2012/0001919 A1* | 1/2012 | Lumer | 345/440 |
| 2012/0005224 A1* | 1/2012 | Ahrens et al. | 707/769 |
| 2012/0042013 A1 | 2/2012 | Roman et al. | |
| 2012/0084188 A1 | 4/2012 | Zuber | |
| 2012/0166438 A1 | 6/2012 | Wu et al. | |
| 2013/0080526 A1* | 3/2013 | Gill et al. | 709/204 |
| 2013/0268591 A1* | 10/2013 | Chen et al. | 709/204 |

OTHER PUBLICATIONS

Braun et al., "People Tagging & Ontology Maturing: Towards Collaborative Competence Management," 8th International Conference on the Design of Cooperative Systems (COOP '08), May 2008, 24 pages.

Mokhtar, et al., "A Self-Organising Directory and Matching Service for Opportunistic Social Networking," SNS'10, Apr. 13, 2010, Paris, France, 6 pages.

SIOC Ontology Sep. 14, 2006, [online], [retrieved on Jul. 18, 2012] Retrieved from SIOC-Project.org using Internet <URL: http://sioc-project.org/ontology> 28 pages.

Web Ontology Language OWL Sep. 6, 2007 [online], [retrieved on Jul. 18, 2012] Retrieved from W3C Semantic Web Activity using Internet <URL: http://www.w3.org/2004/OWL> 3 pages.

International Search Report and Written Opinion in counterpart International Application No. PCT/US2013/058675, mailed Dec. 10, 2013, 11 pages.

Marek Ciglan et al., "SGDB—Simple Graph Database Optimized for Activation Spreading Computation", Database Systems for Advanced Applications, 15th International Conference, DASFAA 2010, International Workshops: GDM, BenchmarX, MCIS, SNSMW, DIEW, UDM, Tsukuba, Japan, Apr. 1, 2010, pp. 45-56.

* cited by examiner

ACTIVITY BASED RECOMMENDATIONS WITHIN A SOCIAL NETWORKING ENVIRONMENT BASED UPON GRAPH ACTIVATION

CROSS REFERENCE TO RELATED APPLICATIONS

This application claims the benefit of U.S. Provisional Application Ser. No. 61/700,546 filed on Sep. 13, 2012, the disclosure of which is incorporated herein by reference in its entirety.

TECHNICAL FIELD

The present disclosure relates to enhancing the performance of operations within a social networking environment, including providing recommendations to users within the environment.

BACKGROUND

Social networks can exist in many different commercial, business and social settings and typically include software platforms that are hosted by one or more network servers, where the social network platforms comprise software tools or software application modules and related services that link computing devices of users within the platform with network servers and computing devices of other users so as to facilitate exchange of information and content between users. The social network platforms include user profiles and activities of interest to the user, including posts of content (e.g., documents, blogs, wikis, etc.) and other types of communications between users within the platform. The social network platforms can further include communities, where a community comprises a collection or group of participants within a social environment who join together based upon one or more common interests or goals. In addition, communities typically include information related to the group of participants, such as posts (e.g., documents, blogs, wikis, etc.) that are associated with the group of participants and are relevant to a particular community. A user or participant in a social network platform typically has an account along with a personal profile within the platform that allows the participant to engage in activities with other participants within the platform. A user profile within a social network platform can include a social graph that identifies relationships between the user and activities associated with the user, such as posted content, other users, communities, etc. within a social network platform.

Certain social network platforms can provide recommendations to a user (e.g., based upon the user's profile) regarding communities, posted content (e.g., documents, blogs, etc.), other users and/or other activities within the social platform that may be of interest to the user. Current recommendation and suggestion systems predominantly pre-compute and prepare recommendations (e.g., by a network platform administrator) which are later presented to an end user, thus such recommendations are not based upon current activities participants within the platform.

DESCRIPTION OF EXAMPLE EMBODIMENTS

Overview

Figure 1:
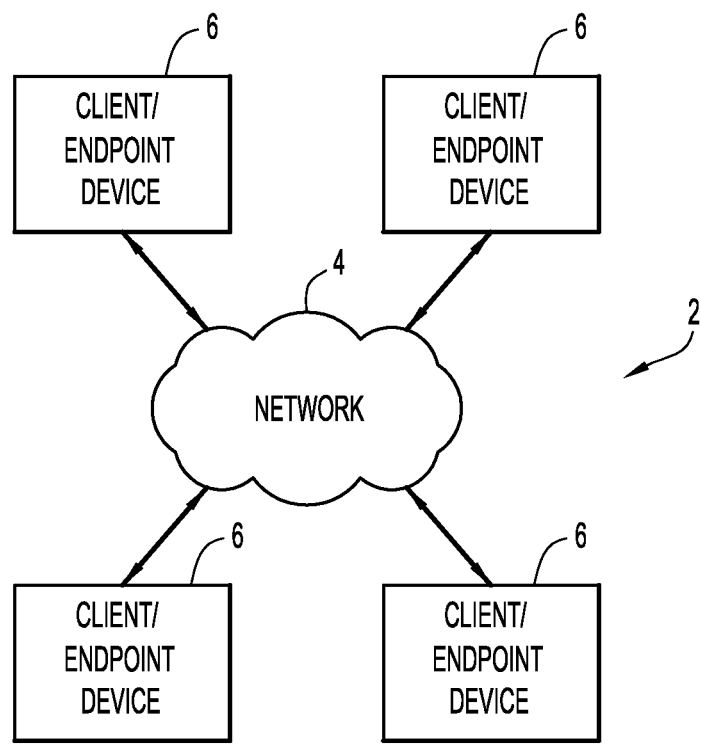
FIG. 1 is a schematic block diagram of an example system in which client endpoint devices are connected with servers to facilitate a networking environment comprising a social network platform in which client endpoint devices communicate with each other.

In a network environment between a group of endpoint computing devices, where content is shared between the group of endpoint computing devices via a social network platform, techniques are described herein for receiving a social activity feed associated with the social network platform, the social activity feed comprising activities occurring within the social network platform. An algorithm is applied to a social graph of a user at an endpoint computing device of the group to determine a prioritization of nodes within the user's social graph, activities within the social activity feed are associated with nodes of the user's social graph, and recommendations are provided to the user of activities within the social activity feed that correspond with prioritized nodes of the user's social graph.

Example Embodiments

Social networking environments are established by endpoint computing devices connecting via a suitable social network platform capable of hosting the environments, where the networking environments facilitate a wide variety of activities and exchanges of communications and content for client endpoints connecting via their computing devices to the networking environment. The social network platform provides software tools or software application modules and related services that link client endpoint devices allowing users to communicate with each other in a variety of different ways (e.g., via email, instant messaging, audio and/or video conferencing, etc.) and share content (e.g., documents, blogs, or any other types of forms of information) via the platform. The term "tool" is used herein to refer to one or more "application" software functions or sets of functions provided by one or more software applications on a computing device and/or hosted on a server on behalf of a computing device.

Application modules refer to a set of one or more software applications that provide the software tools used by the computing devices and/or servers. The social network platform comprises software applications that perform the various operations and functions occurring within the social network environment which are located on client endpoint devices, one or more servers, as well as any other computing devices within the network.

The social network platform can utilize one or more servers that provide a data stream of activities in real-time or near real-time (e.g., within a very short time period, such as within one or more seconds or within one or more fractions of a second, from which such activities are generated or occur within the platform). For example, as activities are generated or posted within the social network platform (e.g., by a client endpoint device), a feed data stream of activities is generated and provided to one or more servers for disseminating to client endpoint devices in substantially the same time at which such activities become available on the social network platform. Examples of activities occurring within the social network platform that can be delivered to client endpoint devices include, without limitation, the posting of content by users and/or within communities (e.g., blogs, documents or any other form of information or content), communications between users and/or communities (e.g., emails, instant messages, etc.), and any other types of activities occurring between users or within communities of the social network platform.

An example of a suitable delivery mechanism for providing an activity data feed stream in real time comprises providing the activity data feed stream in an Extensible Message and Presence Protocol (XMPP) format. An XMPP data stream format communicates data comprising, e.g., messages and other types of content to message-oriented middleware based upon XML (Extensible Markup Language). For example, an XMPP pub-sub (publisher/subscriber) delivery mechanism can be utilized for delivery of activity content to servers and client endpoint devices within the social network platform in real-time or near real-time (e.g., within a relatively short time period, such as within one or more seconds or within one or more fractions of a second, from which activities are generated or occur within the platform). However, it is noted that any other suitable delivery mechanism can also be utilized to ensure delivery of activities within the social network platform in real-time or near real-time.

Some elements or features of activities or other functions that can be performed by users within a social network platform include, without limitation, messaging, including sending and receiving of real-time or near real-time messages (e.g., email, calendaring and scheduling, creating/modifying/updating of contact lists, instant messaging, short messaging service or SMS, web conferencing, white boarding, screen content or desktop sharing, voice, audio and/or video conferencing, etc.), creating/modifying/updating of communities within the social network platform (where communities comprise a group of users sharing one or more common goals or interests, where content within the communities typically relates to such goals or interests), and synchronization and organization of documents or files common to a particular community or group associated with the files (e.g., organization of posted or edited web logs or blogs, wikis, other forms of written ideas and/or notes, etc.). Social network platforms can be designed, e.g., as collaboration platforms, in which large groups of users (e.g., companies, organizations, etc.) collaborate on different activities and there can be a high volume of usage within the platform (e.g., multiple users that may be engaged at any given time) and the platform facilitates multiple simultaneous communication sessions as well as activity feed streams within the platform (e.g., different activity feed streams may be provided to different communities within the platform) in real-time or near real-time.

Referring to FIG. 1, a block diagram is shown for an example system that supports a social networking environment, where client endpoint devices communicate and exchange information with each other. In particular, the system 2 comprises a network 4 that facilitates communications and exchange of communications and content between client endpoint devices 6 via one or more host server devices 20. While three client endpoint devices 6 and one server device 20 are shown, this is for example purposes only, and it is noted that the social network platform can include any suitable number of client computing devices and host server devices that communicate with each other over the network 4. Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Figure 2:
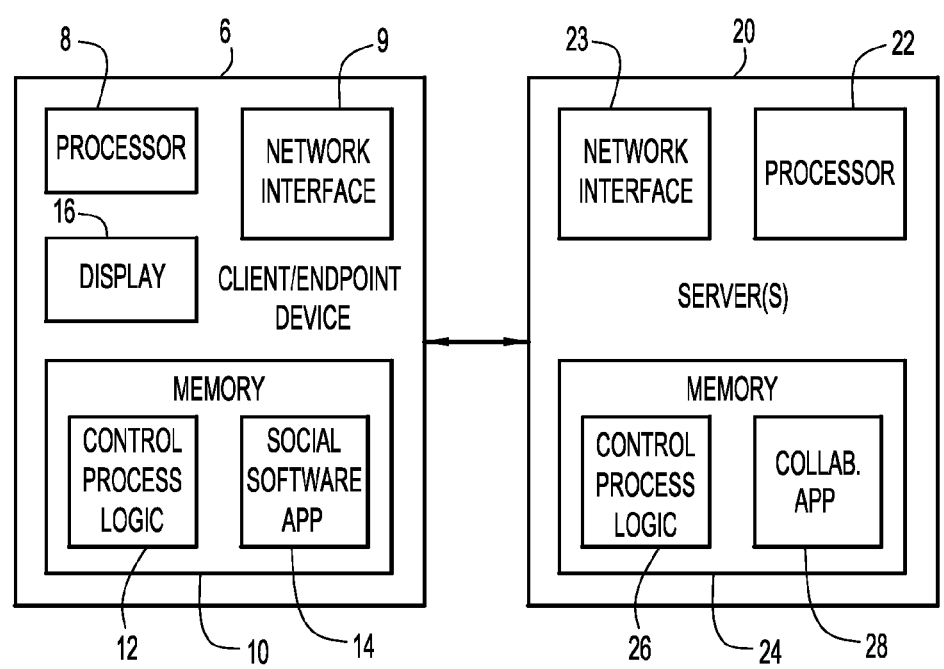
FIG. 2 is a schematic block diagram of an example client endpoint device connected with a server that facilitates operations of the system of FIG. 1 within the social network platform.

An example embodiment is depicted in FIG. 2 of a connection between a client endpoint device 6 connected with a server device 20 via the network 4 of the system of FIG. 1. In particular, a computing device 6 connects with a host server device 20 to facilitate communications and exchange of information with other client endpoint devices 6 associated with users within the social network platform. It is noted that FIG. 2 represents how each client endpoint device 6 of the system of FIG. 1 can connect with a server device 20. It is further noted that, while the embodiment of FIG. 2 depicts a single server device 20, the system 2 can include multiple servers that support the social network platform, including servers (e.g., XMPP servers) that facilitate the delivery of activity feed streams within the platform at real-time or near real-time. Each client endpoint device 6 connects via any suitable wireless and/or hard wired connection to a server device 20 to facilitate communications and exchange of information with other computing devices over the network. In particular, each client endpoint device 6 includes a processor 8, a network interface 9, a memory 10, and a display 16. Similarly, the server device 20 includes a processor 22, a network interface 23, and memory 24. The client endpoint devices 6 and/or server devices 20 can further include any other suitable devices integrated with the devices and/or any other types of peripheral devices that can be connected with the devices to facilitate input of audio, video or other information by a user to the computing device (e.g., keyboards, mouse devices, cameras, microphones, etc.) as well as output or display of audio, video and/or other types of information to the user by the computing device.

The network interfaces 9 and 23 of the client endpoint devices 6 and server devices 20 can be, for example, one or more of an Ethernet interface card or switch, a modem, a router or any other suitable hardware device that facilitates a wireless and/or hardwire connection over the network 4 with one or more server devices 20 and other client endpoint devices 6, where the network interface unit can be integrated within the device or a peripheral that connects with the device.

Each of the processors 8, 22 can comprise at least one microprocessor that executes control process logic instructions 12, 26 stored within memory 10, 24, including operational instructions and software applications stored within such memory (e.g., applications associated with different types of communications and sharing of information via the social network platform).

Figure 3:
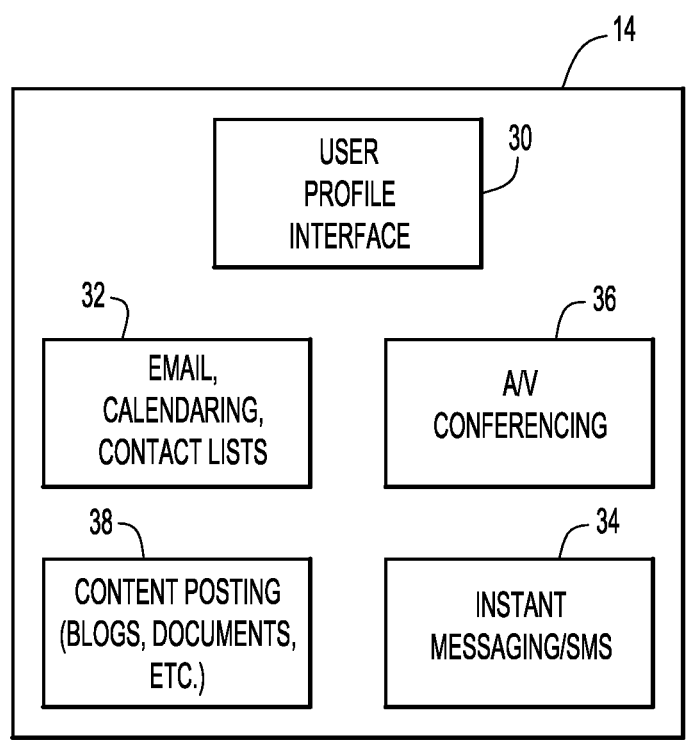
FIG. 3 is a schematic block diagram of an example embodiment of a social software application module associated with a computing device of the system of FIG. 1.

For example, the memory 10 of each client endpoint device 6 includes a social software application module 14 that comprises one or more software applications that provide software tools to facilitate connection of the client endpoint device 6 with other client endpoint devices, server devices and/or other devices within the social network platform and also engage in various activities associated with the platform. An example embodiment of a social software application module 14 for a client endpoint device 6 is depicted in FIG. 3. The social software application module 14 includes software applications that facilitate various types of communications via the platform, such as messaging application(s) 32 (e.g., email, calendaring and scheduling, contact lists, etc.), instant messaging or SMS application(s) 34, conferencing application(s) 36 that facilitate audio and/or video conferences between the computing device and other computing devices within the platform (including desktop sharing of content from one or more computing devices within the session), and application(s) 38 that facilitate posting of content (e.g., posting of content or editing of such posted content, where the content includes, without limitation, documents, web blogs, wikis and/or any other types of written or graphical information).

The module 14 also includes one or more software applications 30 that provide a user profile interface displayed by the display 16 of the client endpoint device 6, where the user profile interface facilitates navigation and interaction by the user in communications and exchange of information with other users as well as access to the various types of content provided within the social network platform. The user profile interface can also provide information about the user that may be unique or personalized to the user, including user interests, user knowledge and user expertise as well as other users and/or communities with which the user is associated. The user profile interface can display and/or participate in the generation, modification, updating and/or maintaining in any suitable manner of a social graph of the user as described herein. In addition, the user profile interface provides a display of recommendations of activities to the user in accordance with techniques described herein.

Figure 4:
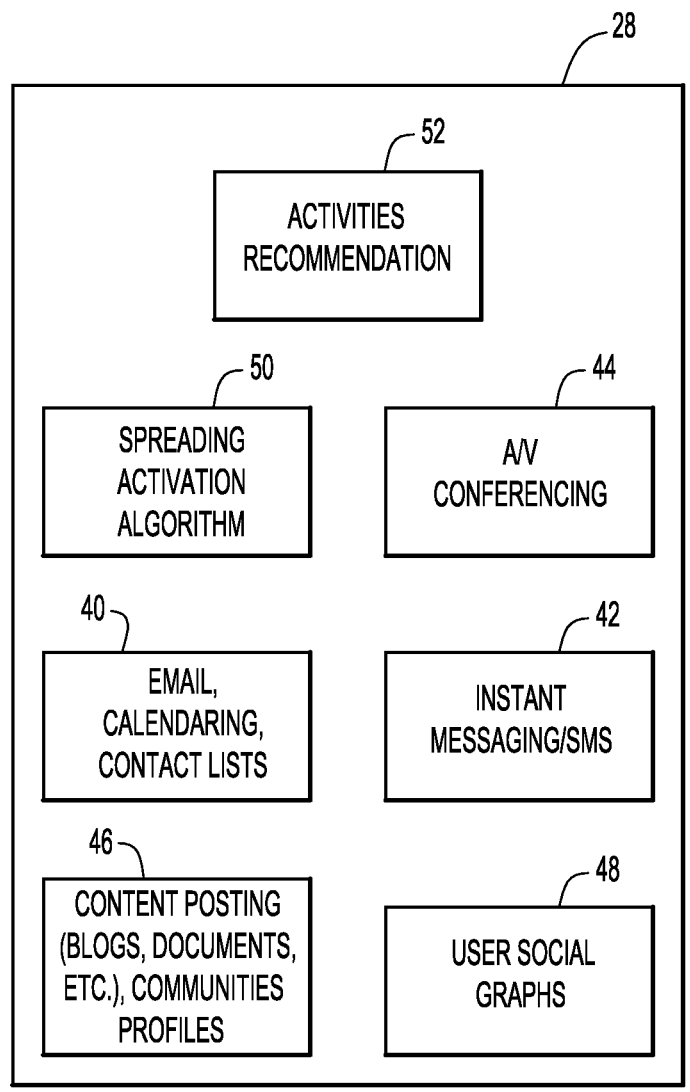
FIG. 4 is a schematic block diagram of an example embodiment of a social software application module associated with a server of the system of FIG. 1.

The memory 24 of each server device 20 also includes a social software application module 28 that comprises one or more software applications that provide software tools to facilitate hosting by the server of the various activities and sharing of content associated with the social network platform, including the generation and transmission of an activity feed stream as described herein. An example embodiment of a social software application module 28 for a server device 20 is depicted in FIG. 4. The social software application module 28 for a server device 20 includes software applications that facilitate hosting functions for various types of communications between client endpoint devices via the social network platform, such as messaging application(s) 40 (e.g., email, calendaring and scheduling, contact lists, etc.), instant messaging or SMS application(s) 42, conferencing application(s) 44 that facilitate audio and/or video conferences between client endpoint devices within the platform (including desktop sharing of content from one or more client endpoint devices within the session), and application(s) 46 that host and/or facilitate storing and editing of posted content (e.g., content that includes, without limitation, documents, web blogs, wikis and/or any other types of written or graphical information).

The module 28 also includes one or more social graphs applications 48 that generate, modify and maintain social graphs for users within the social network platform. A social graph for a user comprises a sociogram or a graphic representation of social links that the user has within the social network platform. In particular, the social graph of a user within the social network platform plots the structure of interpersonal relations of the user as nodes that are interlinked directly or indirectly (where a first node is interlinked indirectly by one, two or more hops or links from a second node, i.e., there are one, two or more nodes linked between the first and second nodes) with each other. The nodes of the user's social graph can represent people designations (e.g., other users that have a certain relationship with the user within the social network), community designations (e.g., communities within which the user has some level of involvement), content/information (e.g., documents, blogs, messages, websites and/or other forms of communication having some relationship with the user) and/or any other suitable relationship associated with the user within the social network platform. Any suitable source node can be designated within a social graph (e.g., designating source nodes based upon a user's current or ongoing activities within the social network, designating select key source nodes that may be constant or dependent upon the user's profile, such as tags associated with the user's profile, etc.). A user can be associated with a single social graph (e.g., a two dimensional or three dimensional graph) that links people with communities and information associated with the user. Alternatively, a user can be associated with a plurality of social graphs (e.g., a separate social graph for people, communities and information associated with the user, where each social graph is linked in some manner with the other social graphs). Each user has his or her own social graph that is generated, modified, updated and maintained in a suitable manner utilizing the social graphs applications 48, where the social graph is unique to a user based upon the user's profile (e.g., knowledge and interests) and established associations with other users and/or groups or communities within the platform.

The module 28 further includes a spreading activation algorithm module 50 and an activities recommendation module 52. As described herein, the spreading activation algorithm module 50 applies a spreading activation algorithm to the social graph of a user in order to determine a priority associated with nodes based upon user activities at a given time within the platform, and the activities recommendation module 52 prioritizes incoming activities of the social activity feed stream based upon the prioritization of nodes of the user's social graph to provide a recommendation to the user of activities from the social activity feed stream in real-time or near real-time. While the spreading activation algorithm module 50 and the activities recommendation module 52 are depicted as separate modules, each can be configured as part of the same module utilizing one or more of the same software applications within the social software application module 28.

The processors 8 and 22 of the client endpoint devices 6 and server devices 20 perform operations in accordance with the steps set forth in the flow chart of FIG. 6 utilizing the social software application modules 14, 28, as described further below.

The memories 10, 24 of the client endpoint devices 6 and server devices 20 may comprise read only memory (ROM), random access memory (RAM), magnetic disk storage media devices, optical storage media devices, flash memory devices, electrical, optical, or other physical/tangible memory storage devices, and any combinations thereof. The display 16 of each client endpoint device can be an LCD or any other suitable type of display, including touch pad displays (e.g., for tablets, smart phones, or other portable types of computing devices) for display of textual and/or graphical content by the processor 8 of the client endpoint device 6, including video, textual, interactive and/or graphical user interface (GUI) content.

Some examples of client endpoint devices 6 or other computing devices that can be used to engage and participate in a social network platform in system 2 include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. The computing devices and servers can utilize any suitable operating systems (e.g., Android, Windows, Mac OS, Symbian OS, RIM Blackberry OS, Linux, etc.) to facilitate interaction, activities and sharing of information between computing devices via the platform.

Suitable server devices 20 can be any suitable types of stationary or other types of computing devices capable of hosting and managing multiple communication sessions of varying types simultaneously as well as activity feed streams and other large flows of data associated with the platform (e.g., flows of communication messages, activities within one or more social activity feed streams, etc.). Each server device 20 can be configured to provide the function of handling and transferring communication messages (e.g., email messages, audio and/or video conferencing content, instant or SMS messaging, etc.) between two or more client endpoint devices 6 over the network 4. Each server device 20 can also be provided with suitable memory capacity to store items of content associated with client communications for each client endpoint device 6 (e.g., saved email messages, instant messaging or SMS communications, and/or audio/video communications, as well as other items of content (e.g., blogs, wikis, white boarding content and/or other types of activities, the sharing of documents, files or other content, e.g., content that is posted and available for access by users of groups or communities within the platform). In addition, each server device 20 can have suitable software tools that facilitate the hosting of synchronous communications between the client endpoint devices 6 as well as multiple simultaneous group communications (e.g., the simultaneous hosting of a web conference between a first group of client endpoint devices and an instant messaging communication session between a second group of client endpoint devices).

Thus, the configurations of client endpoint devices 6 and server devices 20 as described herein facilitate engagement and interactive participation in activities and other features by users within a social network platform, where the platform can facilitate the forming of groups or communities, in which groups of participants are associated, for the purposes of disseminating items of content or engaging in communications or other activities in relation to participants within a particular group. Examples of commercial software products and associated services that provide social network platforms having the general functional features of providing content for and facilitating communications between participants within a platform as previously described include, without limitation, WebEx Connect (Cisco Systems, Inc.), Microsoft SharePoint (Microsoft Corporation) and LotusLive (IBM Corporation). The flow of activities within one or more social activity data feed streams can be provided in any suitable real-time or near real-time delivery mechanism, such as XMPP or any other suitable delivery system.

Figure 5:
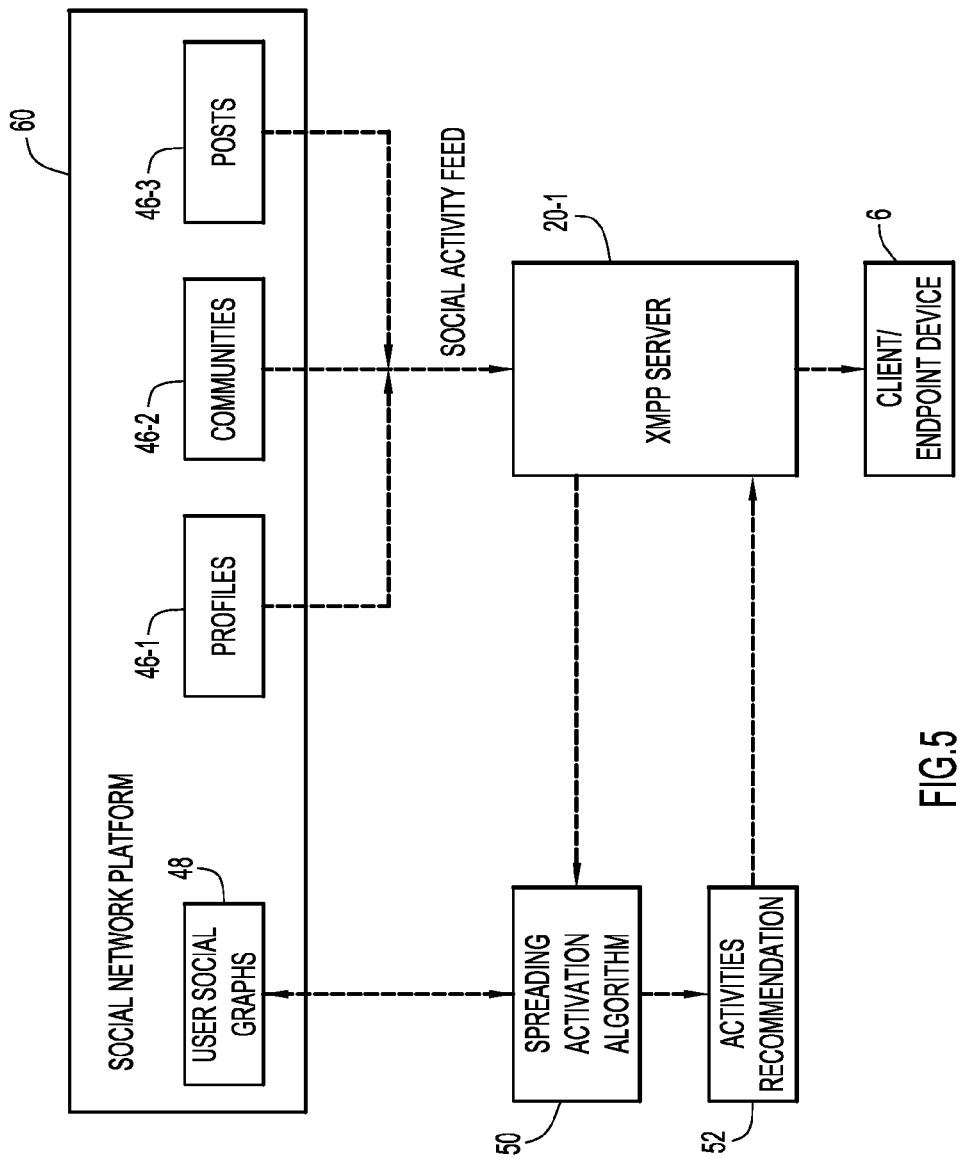
FIG. 5 is a schematic block diagram depicting the flow of a social activity feed stream within a social network platform and processing of the social activity feed stream in real time for providing recommendations of activities to a client endpoint device based upon the social network graph of the user associated with the client endpoint device.

Operation of the social network platform utilizing the system depicted in FIGS. 1-4 so as to provide recommendations to a user of activities in real-time (e.g., at the same time or substantially the same time, such as within one or more seconds or within one or more fractions of a second, that such activities are received within the platform) is now described with reference to the block diagram of FIG. 5 and the flow chart of FIG. 6. Referring to FIG. 5, a schematic view of the social network platform 60 is depicted, in which the user social graphs applications 48, and the profiles 46-1, communities 46-2 and the posts 46-3 are within the social network platform 60 and represent software applications that can be located on client endpoint devices 6, server devices 8 and/or any other computing devices associated with the social network platform 60 (i.e., the social network platform comprises social software applications located on different computing devices in communication with each other over the network 4).

A social activity data feed stream comprises social activities within the platform 60, where activities within the platform can be any activities associated with ongoing instant messaging, emailing, audio and/or video conferencing, posting of content (e.g., documents, blogs, etc.), user profiles being generated, modified or updated in some manner, and the generation, modification, updating, operation, etc. of communities within the platform. For example, postings of content by a user (e.g., uploading a document, posting a blog, sending an email, etc.) within the platform are examples of activities that can be delivered within a social activity feed stream to server devices 20 for dissemination to client devices 6 or other computing devices within the platform. Activities occurring within communities as well as any changes in user profiles can also be provided within the activity feed stream.

The activity content within an activity feed stream can be provided to users based upon a level of access for users in relation to such content. For example, the posting of content within a community in which access is limited to members of the community would result in a limitation of an activity feed stream comprising such posted content being provided to the community members. Similarly, content that is intended by a posting user to be delivered to only one or more select users would be provided in an activity feed stream to only such selected users.

As depicted in FIG. 5, an XMPP server 20-1 is configured to received an activity feed stream from within the social network platform (e.g., receiving activities from one or more client endpoint devices 6 and/or other server devices 20) to facilitate real-time delivery of activities from the activity feed stream to users associated with such activities. The XMPP server 20-1 with the spreading activation algorithm module 50 and the activities recommendation module 52 perform operations according to the techniques described herein to provide recommendations to users of activities in real-time from the activity feed stream based upon an analysis of the social graphs of each user. The spreading activation algorithm module 50 obtains social graph information for each user selected to receive activities from the activity feed stream from the user social graphs application module 48. Each of the spreading activation algorithm module 50 and the activities recommendation module 52 can be located on the XMPP server 20-1 and/or one or more other server devices 20 in communication with the XMPP server 20-1.

Figure 6:
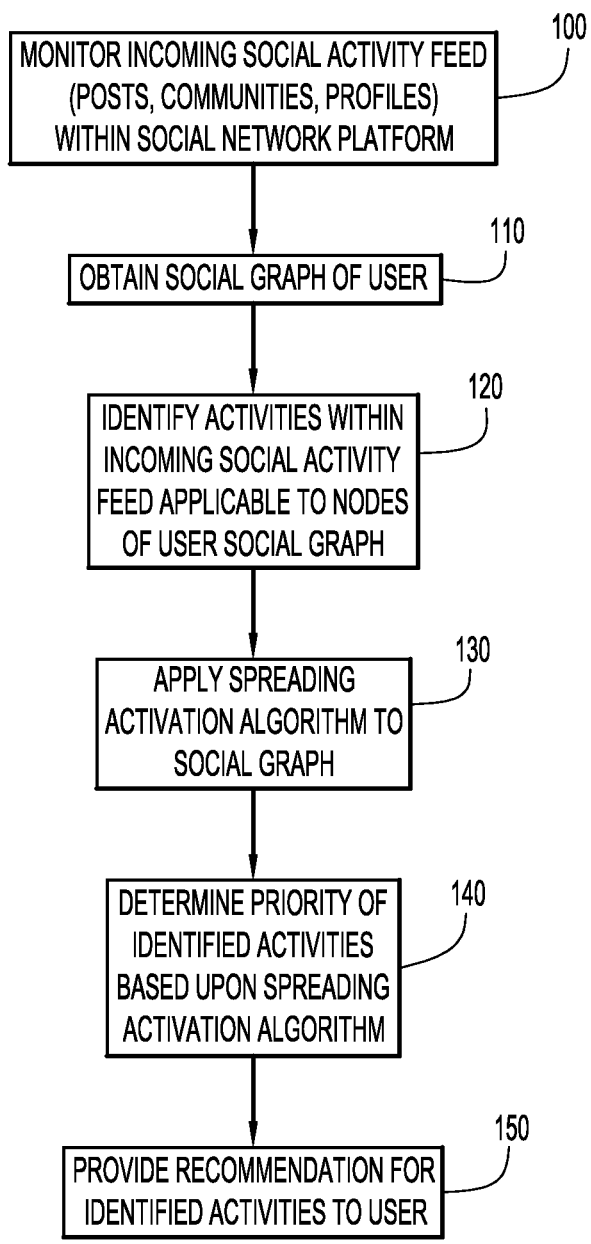
FIG. 6 is a flow chart depicting an example process for applying a spreading activation algorithm to a social graph of a user of a client endpoint device within the social network platform of FIG. 5 as operated by the system of FIG. 1 utilizing the techniques described herein.

The configuration as depicted in FIG. 5 facilitates providing activity recommendations to users at endpoint devices 6 within the system 2 in accordance with the techniques set forth in the flow chart of FIG. 6, where the recommendations are provided in real-time or near real-time using an XMPP format for providing the activity data feed stream. However, it is noted that any other suitable delivery mechanism other than XMPP can also be used to provide activities to users within the platform in real-time or near real-time. A spreading activation algorithm provided by module 50 is used to make real-time recommendations to users based upon interactions of the users within communities and with activities within the social network platform. While the example embodiments described herein utilize a spreading activation algorithm applied to social graphs of users in order to determine recommendations for activities from the social activity feed stream, it is noted that other suitable algorithms can also be applied to user social graphs (e.g., algorithms such as a Top-K algorithm applied to user social graphs).

A spreading activation algorithm utilizes a technique in which sophisticated recommendations can be generated for a user based upon the user's interactions between people, communities and information in a social network (as identified by the user's social graph). The technique itself is inspired by the fact that human memory retrieves information and memory by association. By recalling one memory, other memories which are strongly associated are also remembered. Similarly, in a social network, the associations between people, communities and information, as defined by user social graphs, can be used to provide sophisticated recommendations for users in relation to ongoing activities within the social network platform.

Spreading activation can be applied to a social graph of a user by initially labeling a set of source nodes within a user's social graph with weights or "activation" and then iteratively propagating or "spreading" that activation out to other nodes linked to the source nodes. These "weights" can be assigned real values that decay as activation propagates through the social graph. Activation may originate from alternate paths, identified by distinct markers, and terminate when two alternate paths reach the same node.

Any suitable technique can be utilized to designate source nodes within a user's social graph. For example, source nodes can be designated based upon a user's activity within the social network at any given time. So, for example, in response to a user operating within a particular community at a given time (e.g., the user is reading a blog, opening a document or communicating with another user via email, IM, etc. within a community at the given time), the node or nodes associated with the community within the user's social graph or social graphs can each be designated as a source node for purposes of applying spreading activation to the user's social graph(s). Thus, in this scenario, designated source nodes can change based upon user activity within the social network platform. In an alternative scenario, select key source nodes can be designated from a user's social graph that may be constant or dependent upon the user's profile (such as key words or tags associated with the user's profile, etc.).

A general embodiment of applying a spreading activation algorithm to a user's social graph is described as follows. A social graph of a user within a social network is populated by Nodes [1 ... N] each having an associated activation value A [i] which is a real number (e.g., within a range [0.0 ... 1.0]). A Link[i, j] connects each source node[i] with a target node [j]. Each link has an associated weight W [i, j] (e.g., a real number in the range [0.0 ... 1.0]). The parameters for application of the algorithm include a firing threshold F, which can be a value set as a real number (e.g., within a range [0.0 ... 1.0]), and a decay factor D, which also can be set as a real number (e.g., within a range [0.0 ... 1.0]). The spreading activation algorithm comprises the following steps:

1. Initialize the graph setting all activation values A [i] to zero. Set one or more origin nodes to an initial activation value greater than the firing threshold F. For example, set the initial activation value to 1.0.
2. For each unfired node [i] in the graph having an activation value A [i] greater than the node firing threshold F:
    a. For each Link [i, j] connecting the source node [i] with target node [j], adjust A [j]=A [j]+(A [i]*W [i, j]*D) where D is the decay factor.
    b. If a target node receives an adjustment to its activation value so that it would exceed 1.0, then set its new activation value to 1.0. Likewise maintain 0.0 as a lower bound on the target node's activation value should it receive an adjustment to below 0.0.
3. The algorithm can be configured such that, once a node has fired, it may not fire again. However, the algorithm can also be modified to permit repeated firings and loops through the graph.
4. Nodes receiving a new activation value that exceeds the firing threshold F are marked for firing on the next spreading activation cycle.
5. If activation originates from more than one node, a variation of the algorithm permits marker passing to distinguish the paths by which activation is spread over the graph.
6. The algorithm terminates when either there are no more nodes to fire or, in the case of a marker passing from multiple origins, when a node is reached from more than one path. Variations of the algorithm that permit repeated node firings and activation loops in the graph, terminate after a steady activation state (e.g., with respect to some delta value) is reached, or when a maximum number of iterations is exceeded.

Social graphs of users within social networks are implemented that are capable of being analyzed and acted upon by a spreading activation algorithm, where nodes within a user's social graph can comprise people designations (e.g., other users that have a certain relationship with the user within the social network), community designations (e.g., communities within which the user has some level of involvement) and content/information (e.g., documents, blogs, websites, messages or other forms of communication having some relationship with the user). As previously noted, any suitable source node can be designated within the social graph (e.g., designating source nodes based upon a user's current or ongoing activities within the social network, designating select key source nodes that may be constant or dependent upon the user's profile, such as tags associated with the user's profile, etc.). A user can be associated with a single social graph (e.g., a two dimensional or three dimensional graph) that links people with communities and information associated with the user. Alternatively, a user can be associated with a plurality of social graphs (e.g., a separate social graph for people, communities and information associated with the user, where each social graph is linked in some manner with the other social graphs). In any such scenario in which there is a single social graph or a plurality of social graphs linked to each other in some manner (e.g., one or more nodes from one social graph are linked to one or more nodes of another social graph), the social graph(s) are configured to be acted upon by the spreading activation algorithm for the purposes of assigning activation values to nodes, weights to links between nodes and decay factors associated with nodes according to the spreading activation algorithm.

Referring to FIG. 6, one or more social activity data feed streams comprising activities (e.g., postings of content or modifications to postings of content, generated/updated/modified profiles of users, generated/updated/modified communities, communications such as emails, instant messages, etc.) are provided within the social network platform, where the delivery of such streams in real-time or near real-time to client endpoint devices 6 (e.g., where certain activities may be designated for delivery to specific users or to specific communities of users, or may be generally delivered to all users within pub-sub lists, etc.) is achieved utilizing one or more server devices 20 including XMPP server device 20-1. Each of the activities within the social activity data feed stream can include metadata associated with the activity (e.g., tags or any other suitable information) that identifies content, people, communities or any other descriptive information associated with the activity.

At 100, any incoming social activity data feed stream including activities that may be relevant to a user at a client endpoint device 6 is monitored in real-time by the XMPP server device 20-1 providing the social activity data feed stream to the spreading activation algorithm module 50. As activities are generated within the social network platform, the spreading activation service is applied on a per user basis for each user operating within the social network platform. This is because recommendations of activities may be different between one user and another (based upon each user's profile and corresponding social graph).

The system can be configured to monitor social activity data streams for any selected number of users at client endpoint devices 6. For example, a user may select (via the user profile interface 30) the option of having activities recommended to the user by the system (e.g., by the XMPP server device 20-1, in configurations in which the spreading activation algorithm module 50 and/or activities recommendation module 52 is located on the XMPP server device 20-1), which results in social activity data feed streams being monitored for purposes of making recommendations according to the techniques described herein. Alternatively, the recommendation feature may be a default feature for each user within the social network platform, such that the system monitors social activity data feed streams simultaneously for all users operating within the social network platform at any given time.

For each user that is configured to receive recommendations of activities within the platform, the spreading activation algorithm module 50 obtains the user's social graph at 110 from the platform (e.g., the user's social graph may be located at one or more of the client endpoint device 6 of the user, the XMPP server device 20-1 and any other server device or computing device that is part of the platform within the system 2). At 120, items within the incoming social activity data feed stream are compared with nodes within the user's social graph to determine whether any such activities may have relevance to the user. For example, metadata associated with activities from the data feed stream (e.g., tags or other identifiers comprising words, phrases, symbols, etc.) are compared with nodes in the user's social graph to determine whether there is a match with such nodes. As previously noted, the nodes can represent users, communities and/or content having some association with the user. Each node can further have information associated with the node, such as metadata associated with a user, community or content (e.g., tags or other identifiers). A match between an activity and a node can be based upon a suitable match of the metadata associated with the activity and metadata or other information associated with the node.

At 130, the spreading activation algorithm module 50 performs spreading activation on the social graph obtained for the user. The spreading activation algorithm is applied utilizing the previously described steps, where one or more source nodes are initially selected within the social graph and activation values and decay factors are applied to nodes extending from the source node(s) based upon the algorithm. The source node(s) for the user's social graph can be selected based upon any suitable criteria. For example, the source node(s) can be selected based upon one or more nodes that are associated with tags that are currently prominent or more relevant in relation to other tags within the user's profile (e.g., the tags in the user's profile can be weighted based upon recent activities of the user within the platform, and the nodes in the user's social graph that are associated with tags having greater weighting in relation to tags associated with other nodes may be selected as source nodes). In another example, the source node(s) can be selected based upon activities, communities, forums, messaging with other users, etc. that the user is currently engaged in within the platform at a given time (e.g., if the user is currently operating within a community within the platform, a node of the user's social graph associated with the community can be designated as a source node).

Application of the spreading activation algorithm to the user's social graph assigns activation values to nodes extending from the source node(s). The activation values for nodes decrease according to decay factors as the nodes extend further (e.g., nodes that are located at further "hops") from a source node. The activation values provide priorities for nodes within the social graph based upon user activity within the social network platform at any given time, where a node assigned an activation value that is greater than the activation value assigned another node has a greater priority in relation to the other node.

The spreading activation algorithm module 50 provides the information about the nodes of the user's social network to the activities recommendation module 52, including activation values for nodes and activities within the social activity data feed stream that are identified as being associated with nodes in the user's social graph. At 140, the activities identified as being associated with nodes of the user's social graph are prioritized, using the activities recommendation module 52, based upon the determined prioritizations of the nodes (as determined by the spreading activation algorithm module 50). Recommendation information regarding the prioritization of activities is provided from the activities recommendation module 52 to the XMPP server 20-1.

At 150, recommendations are provided by the XMPP server 20-1 to a user (e.g., which can be displayed within a user profile interface 30 as displayed by the user's client endpoint device 6) for activities in real-time (e.g., in substantially the same time at which the activities are provided within an on-going social activity data feed stream within the social network platform). For example, the recommendations may be provided within a pop-up menu within the user profile interface 30 of the user, where a prioritized listing of activities are displayed with links to such activities (e.g., a link to a community, a user, an item of content, etc.). The recommendations are based upon the activation values assigned to nodes associated with activities. Activities that are only associated with one or more nodes having an activation value (determined by a decay factor of the spreading activation algorithm, where activation values of nodes decrease as they spread further away from a source node) that is less than a threshold value can be eliminated from the recommendations list provided to the user.

Thus, a node that has an assigned activation value that is equal to or greater than the threshold value and is determined as related to one or more particular activities will result in those related activities being provided in the recommendations to the user. In contrast, a node that has an assigned activation value that is less than the threshold value will not result in activities determined as related to this node being provided in the recommendations to the user. The activation values assigned to nodes can also be used to differentiate between nodes at similar levels in the user's social graph (e.g., nodes representing two people similarly related within a user's social graph can be differentiated by having different activation values that have been assigned based upon whether the two people are in the same or different group, organization or community).

Accordingly, the activities recommendation node 52 might recommend only a selected number of social activities (e.g., social activities associated with or related to one or more nodes within the user's social graph that have been assigned an activation value which exceeds a threshold value), and activities within the recommended group can further be prioritized based upon any suitable criteria (e.g., the activation value associated with a node and/or using any other suitable prioritization scheme based upon the user's profile). Recommended activities from the social activity feed stream can be provided in real-time or near real-time by the XMPP server 20-1 to the client/user endpoint device.

An example embodiment of a user operating within the social network platform and receiving activity recommendations from the system 2 according to the previously described techniques is now described with reference to FIGS. 7-9. In this example scenario, the user is operating within a group or community, such that the social activity data feed stream is monitored for incoming activities that are determined as potentially relevant to the particular topic and/or the particular community in which the user is currently engaging. The spreading activation algorithm is applied to the user's social graph (e.g., by selecting one or more source nodes within the user's social graph that are most closely related to the topic or community in which the user is currently engaged) to determine which (if any) of the activities within the social activity feed stream are of greatest relevance. A recommendation of activities can be automatically presented to the user (e.g., via an automatic pop-up window) or, alternatively, the recommendation of activities can be manually selected by the user within the user's web browser.

Figure 7:
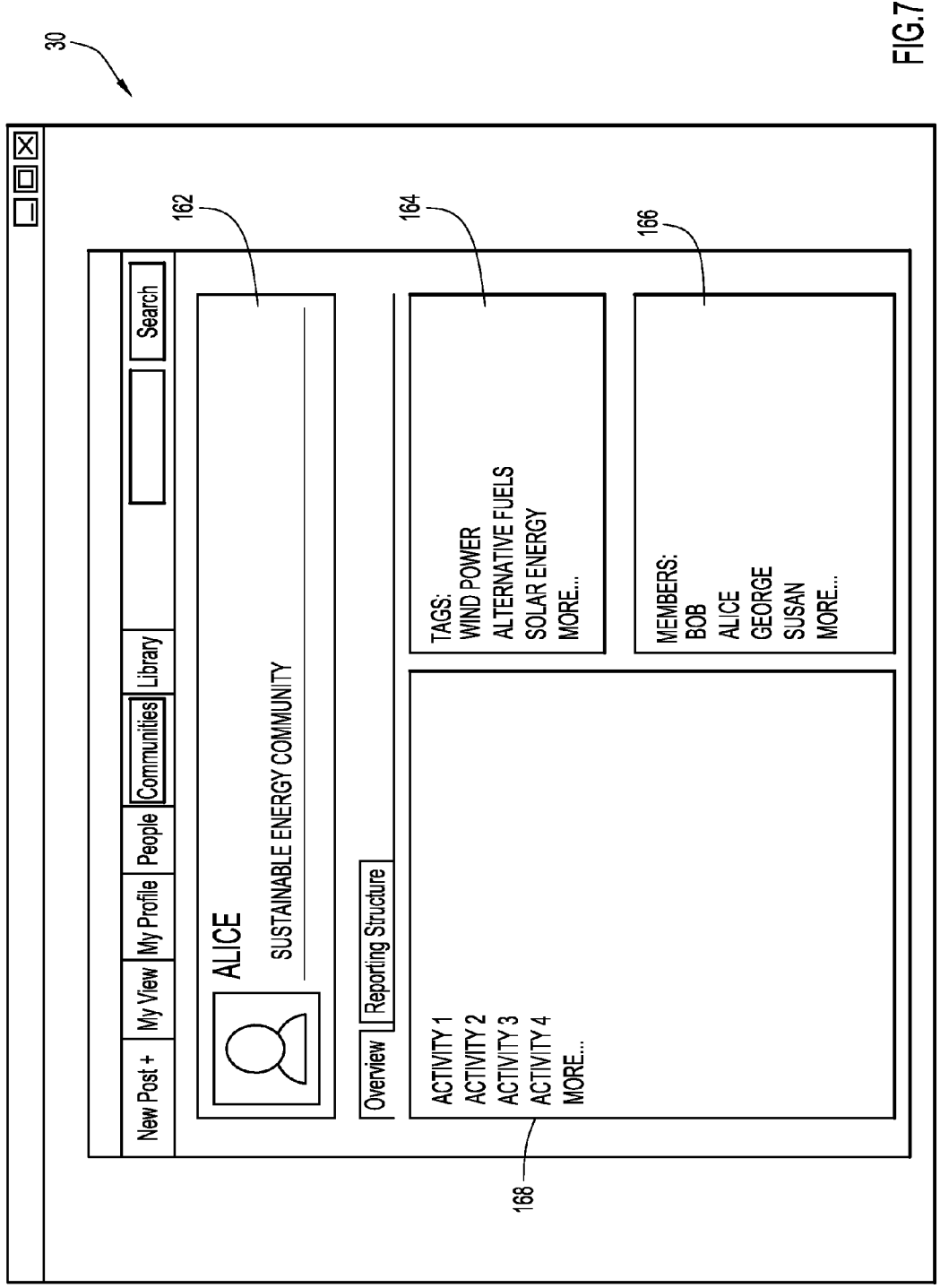
FIGS. 7 and 8 depict example embodiments of graphical user interfaces for a user at a client endpoint device operating within the social network platform and utilizing the system of FIG. 1 and the techniques described herein.
Figure 8:
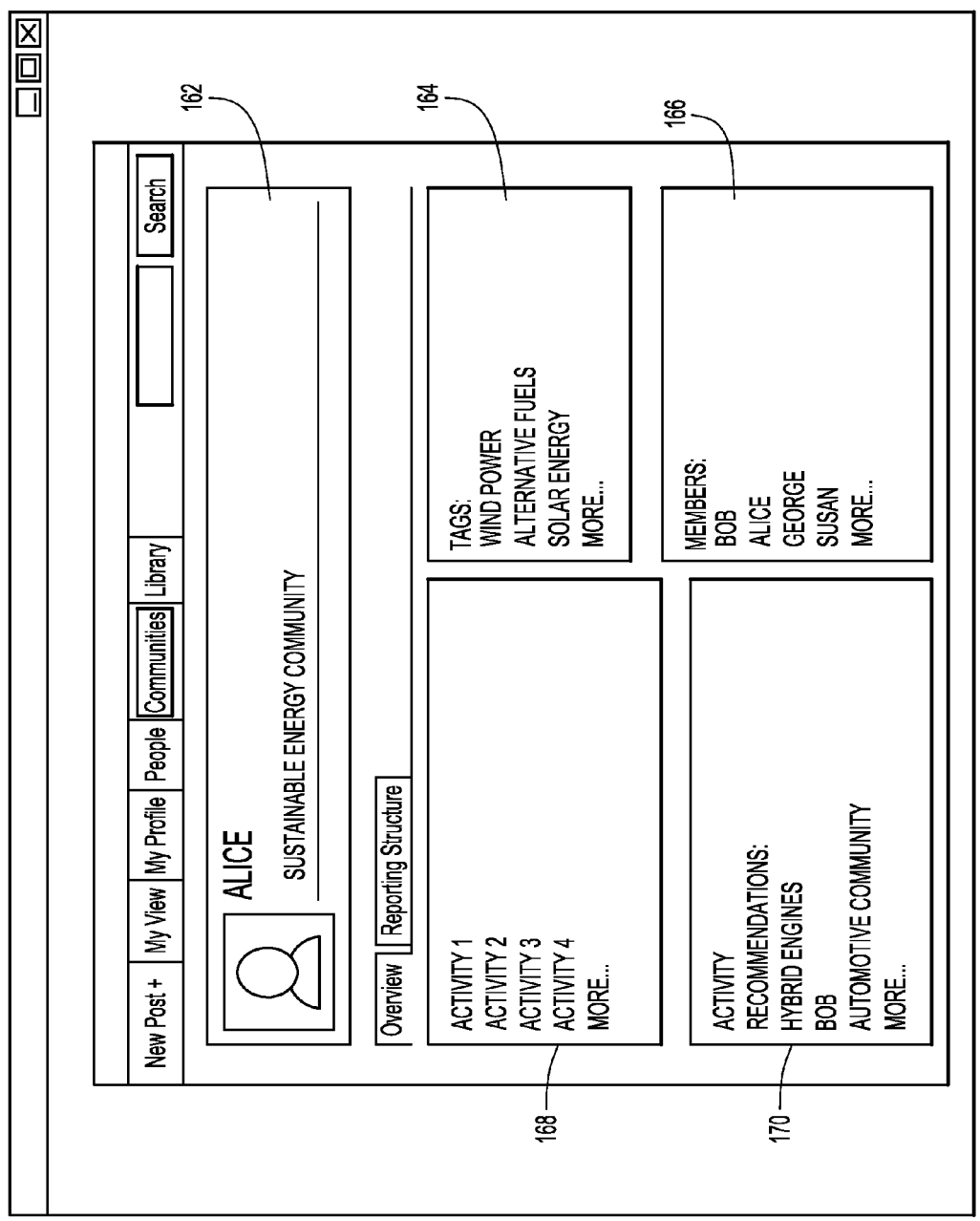

Referring to FIG. 7, an example scenario is provided in which a user is operating within a "Sustainable Energy" community. The user, Alice, has a profile interface 30 that provides interactive features for the user within the social network platform 60, including access to communities, generation/modification and viewing of content, and engaging in communications with one or more other users (e.g., via email, IM, A/V conference sessions, etc.). The interface 30 includes a window 162 that provides an indication of a particular community in which the user Alice is currently active ("Sustainable Energy Community"), a window 164 listing tags associated with the community (e.g., words and phrases, such as "wind power", "alternative fuels", "solar energy", etc. that are of current relevance within the community), a window 166 listing members associated with the community, and window 168 listing recent activities associated with the community (listed generally as "Activity 1", "Activity 2", etc. within the window 168). The activities listed in window 168 can, e.g., provide links to content associated with the activities (e.g., links to a particular website, document, blog, posting, person or any other type of activity) that can be viewed by the user (e.g., within the interface 30).

Figure 9:
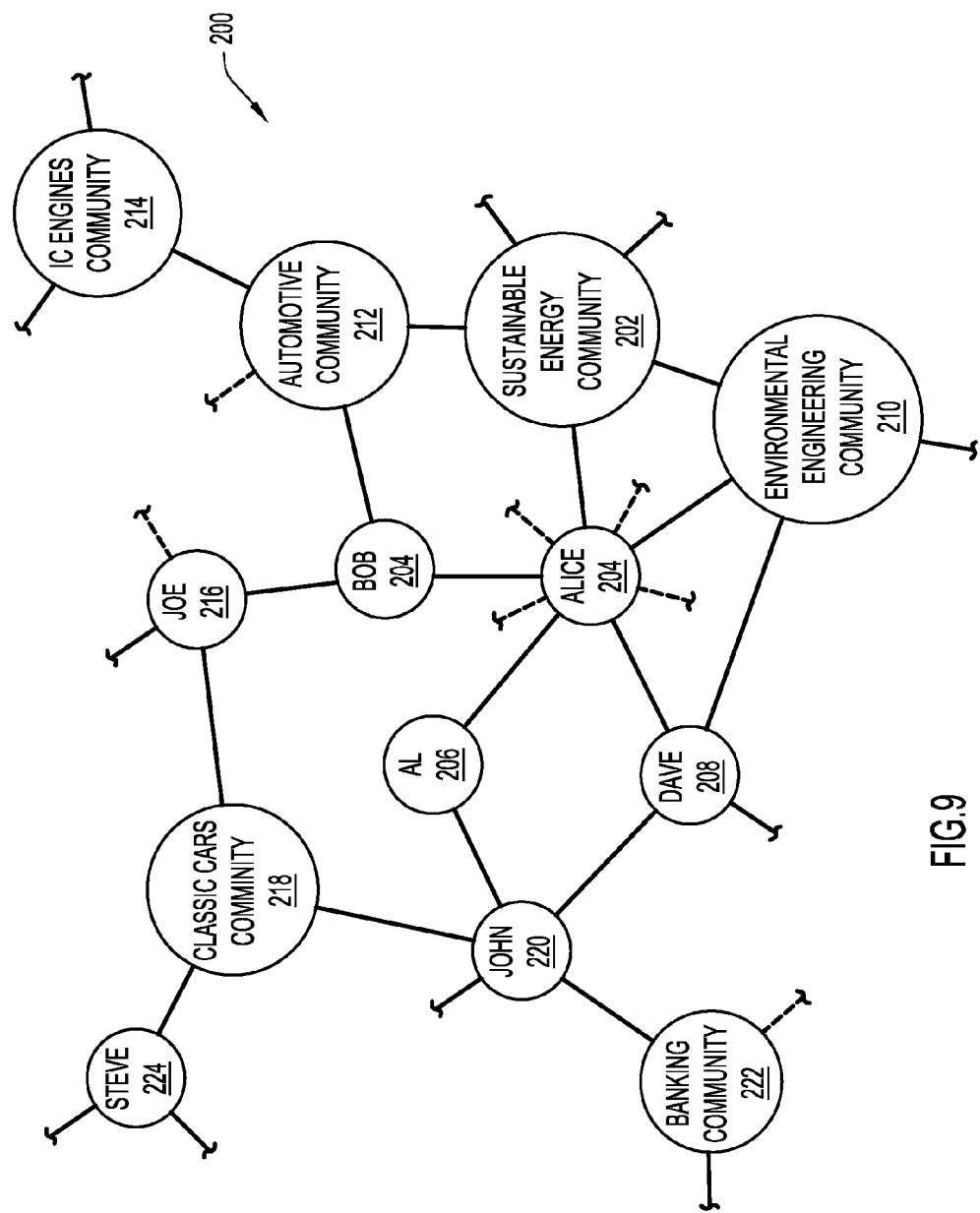
FIG. 9 depicts an example embodiment of a relevant portion of a social graph of the user within the social network platform.

An example embodiment of a relevant portion of a social graph for the user Alice within the social network platform is depicted in FIG. 9. The relevant portion of the social graph 200 comprises a series of interconnected nodes, in which the user Alice is represented by node 201, and various other nodes 202-224 are shown as being interconnected (either directly or indirectly) with the Alice node 201. As previously noted, a user's social graph can be a single social graph, such as a two or three dimensional social graph, or a representation of a plurality of interconnected social graphs, where the social graph(s) link the user with other entities such as people, communities or types of content/information. The placement and distance of the entity nodes in relation to the user node represents the degree of the relationship between the user and the entities. The solid lines between nodes 201-224 represent links in a two dimensional space and dashed lines represent links between nodes in three dimensional space. It is to be understood that the portion of the social graph 200 shown in FIG. 9 is simplified for purposes of the example scenario, since social graphs are typically larger (i.e., including a greater number of nodes in two and/or three dimensional space with respect to each other) and more complex.

As depicted in FIG. 9, the node 201 for Alice is directly linked with nodes 202, 204, 206, 208 and 210 (i.e., there is a single hop between node 201 and nodes 202-210) which represent Sustainable Energy (a community), Bob (a user), Al (a user), Dave (a user) and Environmental Engineering (a community), respectively. Other nodes 212, 214, 216, 218, 220, 222 and 224 represent Automotive (community), Internal Combustion (IC) engines (community), Joe (user), Classic Cars (community), John, Banking (community) and Steve (user), respectively.

In the example scenario, Alice is currently active within the Sustainable Energy community (node 202 in the social graph 200) of the social network platform 60, e.g., viewing current content within this community (such as one of the activities listed in window 168 of the interface 30). At around the same time while Alice is operating within the Sustainable Energy community, Bob (represented at node 204) posts an item of content (e.g., a blog or document) entitled "Hybrid Engines" within an Automotive community (represented by node 212). The XMPP server 20-1 receives a social activity feed stream in real-time, which includes the "Hybrid Engines" item of content just posted by Bob, and items within the feed are automatically analyzed by the spreading activation algorithm application module 50 in order to provide recommendations of activities to users in real-time or substantial real-time (e.g., within minutes or seconds of each activity being implemented within the platform 60, such as the "Hybrid Engines" item of content being posted by Bob within the Automotive community).

The spreading activation algorithm application module 50 applies one or more spreading activation algorithms individually to one or more user social graphs, where user social graphs are obtained from the user social graphs applications 48. In the example scenario, the social graph 200 for the user Alice is analyzed utilizing the spreading activation algorithm 50, where one or more source nodes are initially selected utilizing the techniques as described herein. Since Alice is currently active within the Sustainable Energy community, node 202 is designated as a source node. The node 201 representing Alice can optionally also be designated a source node. Assuming a maximum activation value is 1, the source nodes (including node 202) are set at 1. Weight values for the links can be set to the same value, and a firing factor and/or decay factor value (e.g., 0.9, 0.8, 0.7, etc.) can be set depending upon how far removed nodes are desired to be considered relevant in relation to the source nodes. In the example scenario, nodes 204, 210 and 212 are directly linked with (i.e., a single hop from) source node 202. Based upon this, activities that are associated with any of these nodes will have a greater relevance for Alice at the current time or instance in which she is currently operating within the platform 60 (i.e., Alice is currently operating within the Sustainable Energy community) in relation to nodes that are further removed from source node 202 or other source nodes (e.g., nodes that are two or more hops from a source node). Further, depending upon the decay factor value that is set, some nodes will have activation values that are less than a designated threshold value so as to be considered not relevant to a user based upon the user's current operation within the social network platform 60. In the example scenario, the decay factor can be set such that, e.g., nodes that are further than 3 hops from a source node are assigned an activation value that is less than a predetermined threshold value. In addition, nodes that are one hop from a source node are assigned activation values that are greater in relation to nodes further away (e.g., 2 hops or more) from source nodes. The activities recommendation module 52 assigns priority to recommended incoming activities to a particular user based upon the activation values assigned to nodes to which such activities are associated.

Alice is not a member of the Automotive community in which Bob posted the "Hybrid Engines" item of content. However, as depicted in the social graph 200, Alice is directly connected with Bob (e.g., Bob is a friend of Alice). The "Hybrid Engines" item of content is associated within Alice's social graph 200 with at least nodes 204 and 212, since Bob is the author/generator of this item of content (e.g., as indicated via metadata associated with the item of content) and since this item of content was posted within the Automotive community. Therefore, the "Hybrid Engines" item of content is recommended to Alice, utilizing the activities recommendation engine 52, in real-time or near real-time. In addition, this item of content can be prioritized in a recommendation list to Alice, based upon the activation value assigned to the node to which it is assigned. The interface 30 depicted in FIG. 8 shows an activities recommendation window 170 in which "Hybrid Engines" is listed (where this listing can provide a link to the content associated with this item). Other recommended activities can include users, communities and/or other types of information or content (e.g., Bob, the Automotive community, etc.) can also be listed that are associated with this item of content. The recommendation window 170 can be provided within the interface 30 as a pop-up window to show recommended activities as they are determined for a user at any given time based upon the incoming stream of activities, the user's activities within the platform 60.

The firing and weight factors utilized by the spreading activation algorithm module 50 assist in increasing accuracy of recommending activities to the user while the decay factor enhances the performance of the activities recommendation module 52 by limiting the range of activation of nodes away from one or more source nodes within the social network graph 200. For example, the limitation of activated nodes (i.e., nodes which may be considered for activities to recommend to a user) consequently limits the analysis required to determine a priority recommendation for activities that are associated with nodes (since activities associated with nodes that are beyond the decay factor range from a source node need not be considered). This is a particularly useful feature in ensuring that relevant activity recommendations can be made in real-time (e.g., within seconds of the generation of such activities within the incoming activity stream) to users operating within the platform 60.

As indicated by the example scenario, current activities of the user can be considered to determine which nodes within the user's social graph are designated as source nodes for implementation of the spreading activation algorithm(s). In the example scenario, in response to Alice leaving the Sustainable Energy community and engaging in other activities (e.g., entering another community, such as the Environmental Engineering community represented by node 210 in Alice's social graph 200), one or more spreading activation algorithms (and/or other types of suitable algorithms) can be applied using module 50 to the social graph 200 based upon a shifting of source nodes due to the change in Alice's activities within the social network platform 60.

Thus, by applying a spreading activation algorithm (and/or other types of suitable algorithms) to the social graphs of users in relation to an incoming activity data feed streams within a social network platform, sophisticated recommendations can be made to users about events that are currently occurring within the social network. The spreading activation algorithms utilize human/neural like approaches to establish user awareness of related events in the social network that are of potential relevance to the user based upon current events. This further provides users within the social network with useful information that they would not have otherwise known based on immediate events.

In addition, the present invention is not limited to providing recommendations within social network environments, but also has applications in other areas including, without limitation, XMPP based instant messaging analysis and recommendations ranging from productivity to security applications (e.g., intelligence/counter-terrorism applications, etc.).

The above description is intended by way of example only.

What is claimed is:

1. A method comprising:
   in a network environment between a group of endpoint computing devices, wherein content is shared between the group of endpoint computing devices via a social network platform, receiving a social activity feed associated with the social network platform, the social activity feed comprising activities occurring in real-time or near real-time within the social network platform;
   applying an algorithm to a social graph of a user at an endpoint computing device of the group to determine a prioritization of nodes within the user's social graph, wherein the applying the algorithm comprises designating a source node within the social graph, and prioritizing nodes within the social graph based upon a distance of nodes from the source node, wherein the prioritizing nodes comprises:
      applying activation values to nodes within the social graph based upon a decay factor, wherein the decay factor decreases an activation value applied to each node as a function of an increasing distance of each node from the source node, such that each node that is closer to the source node has a greater activation value in relation to all other nodes further in distance from the source node; and
      eliminating each node and any corresponding activity within the social activity feed associated with each node from recommendation analysis based upon an activation value applied to the node that is less than a threshold value;
   associating activities within the social activity feed with nodes of the user's social graph; and
   providing recommendations to the user of activities within the social activity feed that correspond with prioritized nodes of the user's social graph.

2. The method of claim 1, wherein a plurality of source nodes are designated within the social graph.

3. The method of claim 1, wherein the designating the source node within the social graph is based upon a first activity in which the user is currently engaged within the social network platform.

4. The method of claim 3, further comprising, in response to the user switching from a first activity to a second activity:
re-applying the algorithm to the social graph of the user to determine another prioritization of nodes within the user's social graph, including designating a different source node based upon the re-applying of the algorithm and re-prioritizing nodes within the social graph based upon a distance of nodes from the different source node;
associating activities within the social activity feed with nodes of the user's social graph; and
providing recommendations to the user of activities within the social activity feed that correspond with re-prioritized nodes of the user's social graph.

5. The method of claim 1, further comprising:
providing different recommendations to different users of activities within the social activity feed that correspond with a prioritization of nodes for the social graph of each user.

6. The method of claim 1, wherein the source node within the social graph of the user is designated based upon current or ongoing activities by the user within the social network platform.

7. An apparatus comprising:
a memory configured to store instructions including one or more applications that receive and store a social activity feed associated with a social network platform within a network environment between a group of endpoint computing devices, wherein content is shared between the group of endpoint computing devices via the social network platform, the social activity feed comprising activities occurring in real-time or near real-time within the social network platform; and
a processor configured to execute and control operations of the one or more applications so as to:
apply an algorithm to a social graph of a user at an endpoint computing device of the group to determine a prioritization of nodes within the user's social graph, wherein the applying the algorithm comprises designating a source node within the social graph, and prioritizing nodes within the social graph based upon a distance of nodes from the source node, wherein the prioritizing nodes comprises:
applying activation values to nodes within the social graph based upon a decay factor, wherein the decay factor decreases an activation value applied to each node as a function of an increasing distance of each node from the source node, such that each node that is closer to the source node has a greater activation value in relation to all other nodes further in distance from the source node; and
eliminating each node and any corresponding activity within the social activity feed associated with each node from recommendation analysis based upon an activation value applied to the node that is less than a threshold value;
associate activities within the social activity feed with nodes of the user's social graph; and
provide recommendations to the user of activities within the social activity feed that correspond with prioritized nodes of the user's social graph.

8. The apparatus of claim 7, wherein the processor, via application of the algorithm, is further configured to designate a plurality of source nodes within the social graph.

9. The apparatus of claim 7, wherein the processor, via application of the algorithm, is further configured to designate the source node within the social graph based upon a first activity in which the user is currently engaged within the social network platform.

10. The apparatus of claim 9, wherein the processor, via application of the algorithm and in response to the user switching from a first activity to a second activity, is further configured to:
re-apply the algorithm to the social graph of the user to determine another prioritization of nodes within the user's social graph, including designating a different source node based upon the re-applying of the algorithm and re-prioritizing nodes within the social graph based upon a distance of nodes from the different source node;
associate activities within the social activity feed with nodes of the user's social graph; and
provide recommendations to the user of activities within the social activity feed that correspond with re-prioritized nodes of the user's social graph.

11. The apparatus of claim 7, wherein the processor, via application of the algorithm, is further configured to:
provide different recommendations to different users of activities within the social activity feed that correspond with a prioritization of nodes for the social graph of each user.

12. The apparatus of claim 7, wherein the processor, via application of the algorithm, is further configured to designate the source node within the social graph based upon current or ongoing activities by the user within the social network platform.

13. One or more computer readable storage media encoded with software comprising computer executable instructions and when the software is executed operable to:
in a network environment between a group of endpoint computing devices, wherein content is shared between the group of endpoint computing devices via a social network platform, receive a social activity feed associated with the social network platform, the social activity feed comprising activities occurring in real-time or near real-time within the social network platform;
apply an algorithm to a social graph of a user at an endpoint computing device of the group to determine a prioritization of nodes within the user's social graph, wherein the applying the algorithm comprises designating a source node within the social graph, and prioritizing nodes within the social graph based upon a distance of nodes from the source node, wherein the prioritizing nodes comprises:
applying activation values to nodes within the social graph based upon a decay factor, wherein the decay factor decreases an activation value applied to each node as a function of an increasing distance of each node from the source node, such that each node that is closer to the source node has a greater activation value in relation to all other nodes further in distance from the source node; and
eliminating each node and any corresponding activity within the social activity feed associated with each node from recommendation analysis based upon an activation value applied to the node that is less than a threshold value;
associate activities within the social activity feed with nodes of the user's social graph; and
provide recommendations to the user of activities within the social activity feed that correspond with prioritized nodes of the user's social graph.

14. The computer readable storage media of claim 13, wherein the instructions are operable to designate a plurality of source nodes within the social graph.

15. The computer readable storage media of claim 13, wherein the instructions are operable to designate the source node within the social graph based upon a first activity in which the user is currently engaged within the social network platform.

16. The computer readable storage media of claim 15, wherein the instructions, in response to the user switching from a first activity to a second activity, are operable to:
   re-apply the algorithm to the social graph of the user to determine another prioritization of nodes within the user's social graph, including designating a different source node based upon the re-applying of the algorithm and re-prioritizing nodes within the social graph based upon a distance of nodes from the different source node;
   associate activities within the social activity feed with nodes of the user's social graph; and
   provide recommendations to the user of activities within the social activity feed that correspond with re-prioritized nodes of the user's social graph.

17. The computer readable storage media of claim 15, wherein the instructions are further operable to:
   provide different recommendations to different users of activities within the social activity feed that correspond with a prioritization of nodes for the social graph of each user.

18. The computer readable storage media of claim 13, wherein the instructions are operable to designate the source node within the social graph based upon current or ongoing activities by the user within the social network platform.

* * * * *